(12) United States Patent
Yamamoto

(10) Patent No.: US 12,073,133 B2
(45) Date of Patent: Aug. 27, 2024

(54) SYSTEM AND METHOD FOR PROVIDING PRINTING SERVICE AND CONFIGURED TO CHANGE PRINTER CONNECTION DESTINATION

(71) Applicant: CANON KABUSHIKI KAISHA, Tokyo (JP)

(72) Inventor: Hiroyuki Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/345,690

(22) Filed: Jun. 30, 2023

(65) Prior Publication Data

US 2024/0012590 A1    Jan. 11, 2024

(30) Foreign Application Priority Data

Jul. 5, 2022 (JP) ................................ 2022-108460

(51) Int. Cl.
*G06F 3/12* (2006.01)

(52) U.S. Cl.
CPC .......... *G06F 3/1236* (2013.01); *G06F 3/1203* (2013.01); *G06F 3/1229* (2013.01); *G06F 3/1259* (2013.01); *G06F 3/1274* (2013.01); *G06F 3/1288* (2013.01)

(58) Field of Classification Search
CPC .... G06F 3/1236; G06F 3/1203; G06F 3/1229; G06F 3/1259; G06F 3/1274; G06F 3/1288
See application file for complete search history.

(56) References Cited

U.S. PATENT DOCUMENTS

| | | | | |
|---|---|---|---|---|
| 2012/0287462 | A1* | 11/2012 | Kimura | G06F 3/1259 358/1.15 |
| 2015/0124290 | A1* | 5/2015 | Tajima | G06F 3/1288 358/1.15 |
| 2020/0045204 | A1* | 2/2020 | Niimoto | H04N 1/4426 |
| 2020/0336609 | A1* | 10/2020 | Horie | G06F 3/1211 |
| 2021/0279021 | A1* | 9/2021 | Morimura | G06F 3/1211 |

FOREIGN PATENT DOCUMENTS

JP          2013168180 A    8/2013

* cited by examiner

*Primary Examiner* — Nicholas Pachol
(74) *Attorney, Agent, or Firm* — Canon U.S.A., Inc. IP Division

(57) ABSTRACT

A system includes servers for providing a printing service. Each server manages printer information relating to a printing apparatus connected thereto and print job information relating to a print job to be executed by a printing apparatus connected thereto. After a first server obtains a change instruction to change a connection destination of a specific printing apparatus connected to the first server to a second server, the first server transmits the printer information of the specific printing apparatus to the second server. After the first server obtains the change instruction, the first server instructs the specific printing apparatus to connect to the second server. After the connection destination of the specific printing apparatus is changed to the second server, the first server transmits the print job information of the specific printing apparatus to the second server.

8 Claims, 10 Drawing Sheets

SYSTEM AND METHOD FOR PROVIDING PRINTING SERVICE AND CONFIGURED TO CHANGE PRINTER CONNECTION DESTINATION

BACKGROUND OF THE DISCLOSURE

Field of the Disclosure

The present disclosure relates to a system and a method for providing a printing service.

Description of the Related Art

A known printing service causes a printing apparatus to print based on a printing instruction obtained from a client apparatus via a network. Such a printing service may be provided using a system including a plurality of management servers. The printing apparatus usable in the printing service is connected to one of the management servers and receives a print job from the management server. Each management server manages the state of the print job to be executed by the printing apparatus connected to the management server. The technique described in Japanese Patent Laid-Open No. 2013-168180 can dynamically move servers without interrupting the operations of a Web browser. When the printing apparatus connected to a management server is to be connected to a different management server, information relating to the print job of the printing apparatus is transmitted from the original management server to the new management server. Depending on the timing of the transmission of the information relating to the print job, an inconsistency may occur between the state of the print job at the printing apparatus and the state of the print job managed by the management server.

SUMMARY OF THE DISCLOSURE

An aspect of the present disclosure provides techniques for appropriately managing the state of a print job in a printing service. According to an embodiment, a system comprising a plurality of management servers for providing a printing service is provided. Each of the plurality of management servers manages printer information relating to a printing apparatus connected thereto and print job information relating to a print job to be executed by a printing apparatus connected thereto. The plurality of management servers include a first management server and a second management server. The first management server is configured to, after the first management server obtains a change instruction to change a connection destination of a specific printing apparatus connected to the first management server to the second management server, transmit the printer information of the specific printing apparatus to the second management server, after the first management server obtains the change instruction, instruct the specific printing apparatus to connect to the second management server, and after the connection destination of the specific printing apparatus is changed to the second management server, transmit the print job information of the specific printing apparatus to the second management server.

Further features of the present disclosure will become apparent from the following description of exemplary embodiments with reference to the attached drawings.

DESCRIPTION OF THE EMBODIMENTS

Figure 1:
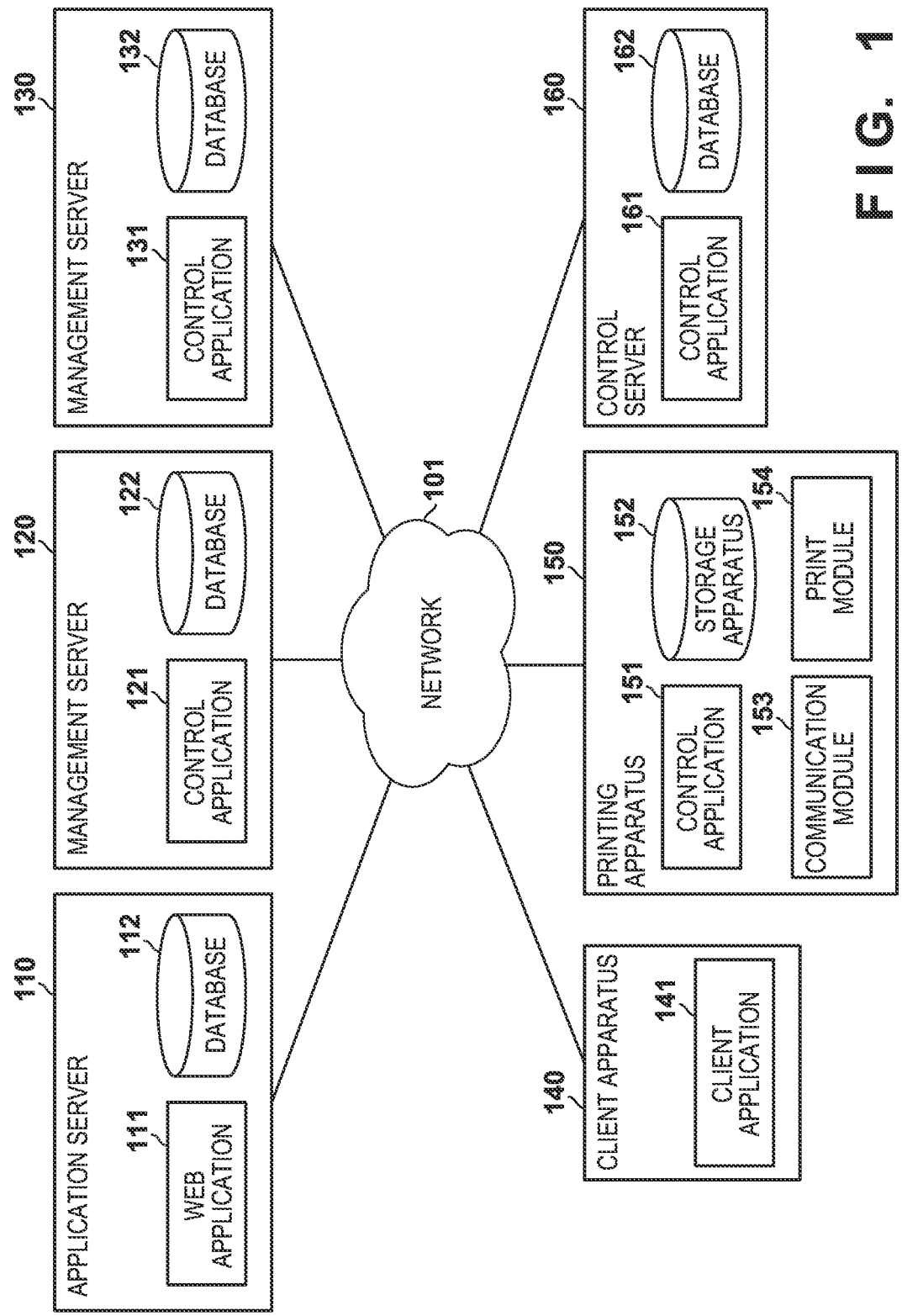
FIG. 1 is a block diagram for describing an example of the configuration of a system for providing a printing service according to an embodiment.

Hereinafter, embodiments will be described in detail with reference to the attached drawings. Note, the following embodiments are not intended to limit the scope of the present disclosure. Multiple features are described in the embodiments, but limitation is not made to a technique that requires all such features, and multiple such features may be combined as appropriate. Furthermore, in the attached drawings, the same reference numerals are given to the same or similar configurations, and redundant description thereof is omitted.

Printing System Configuration Example

An example of the configuration of a system for providing a printing service according to some embodiments will be described with reference to FIG. 1. The system for providing a printing service may also be referred to as the printing system. For example, the printing system may include an application server 110, management servers 120 and 130, a client apparatus 140, a printing apparatus 150, and a control server 160. The printing system provides a printing service to a user of the client apparatus 140, for example. The part of the printing system for managing the print jobs executed by the printing apparatus may also be referred to as the printing management system. For example, the printing management system may include the application server 110 and the management servers 120 and 130. The control server 160 may be considered to be included in the printing management system or may be considered to not be included. The number of the components included in each system described above is not limited to the number in the example in FIG. 1. For example, the printing system may include a plurality of printing apparatuses 150 and may include a plurality of client apparatuses. Also, each system described above may include components not illustrated in FIG. 1.

The application server 110, the management servers 120 and 130, the client apparatus 140, and the printing apparatus 150 cooperate to provide the printing service to the user of the client apparatus 140. Specifically, the application server 110 receives a printing instruction from the user via a client application 141 of the client apparatus 140. The application server 110, in response to the printing instruction being received, transmits a print request to one of the management servers (for example, the management server 120). The management server 120 generates a print job based on the print request and transmits the print job to the printing apparatus 150. The printing apparatus 150 performing printing according to the received print job. When the printing management system is installed in a cloud environment, the printing service may be referred to as a cloud printing service. Alternatively, the printing management system may be installed in an on-premises environment.

The application server 110, the management servers 120 and 130, the client apparatus 140, the printing apparatus 150, and the control server 160 can communicate via a network 101. The network 101 may be a local area network (LAN), a wide area network (WAN), a telephone line, a dedicated digital line, an asynchronous transfer mode (ATM), a frame relay line, a cable television line, a wireless line for data broadcast, or the like. The network 101 may include a discretionary combination of these networks. For example, the network 101 may include the Internet. In FIG. 1, a solitary network 101 is illustrated. However, the network 101 may be physically or logically divided.

The application server 110 is a server that executes an application for providing a service to a user. The application server 110 includes a Web application 111 and a database 112. The Web application 111 transmits print requests to the management servers 120 and 130 and receives operation information of the printing apparatus 150 from the management servers 120 and 130. The database 112 stores various types of information for providing the printing service to a user.

The management server 120 is a server for providing the printing service. For example, the management server 120 receives event information, such as errors and alerts, transmitted from the printing apparatus 150 and transmits print jobs to the printing apparatus 150. The management server 120 includes a control application 121 and a database 122. The control application 121 generates a print job based on a print request received from the application server 110 and transmits the print job to the printing apparatus 150. The database 122 stores client information for connecting the printing apparatus 150, information relating to the printing apparatus 150, information relating to print jobs, and the like.

Hereinafter, information relating to the printing apparatus is referred to as printer information, and information relating to print jobs is referred to as print job information. The database 122 may include records for each printing apparatus when the printer information is stored in a table format. The database 122 may include records for each print job when the print job information is stored in a table format. The printing apparatus (for example, the printing apparatus 150) usable in the printing service is connected to one of the plurality of management servers (for example, the management servers 120 and 130) included in the printing management system. The printing apparatus connected to a specific management server transmits information to be provided to the printing management system to the specific management server. The printing apparatus being connected to a specific management server may be represented by the printing apparatus being associated with a specific management server or may be represented by the printing apparatus being registered with a specific management server.

The management server 120 uses the database 122 to manage the printer information relating to the printing apparatus connected to it (in other words, the management server 120) and the print job information relating to the print job to be executed by the printing apparatus connected to itself. The management server 120 may not manage the printer information and the print job information of the printing apparatus not connected to itself.

The printer information may include the identification information of the printing apparatus, the address (for example, the Internet Protocol (IP) address) of the printing apparatus, and the attribute information (for example, the functions of the printing apparatus) of the printing apparatus, for example. In the present specification, the identification information may be information for uniquely identifying a subject unless otherwise stated. The print job information may include the identification information of the print job, the identification information of the printing apparatus that executes the print job, the data to be printed, the settings used for printing, and the progress state of the print job, for example.

The management server 130 includes a control application 131 and a database 132. The management server 130 is a server similar to the management server 120, and thus redundant descriptions will be omitted. When the printing management system is installed in a cloud environment, the management servers 120 and 130 may be placed in different regions in the cloud environment or may be placed in the same region.

The client apparatus 140 is an apparatus that runs the client application 141 used by the user to receive provision of the printing service from the application server 110. The client application 141 may be a dedicated printing service application or may be a Web browser.

The printing apparatus 150 has a print function for printing based on print jobs. The printing apparatus 150 may include a scanner function and/or a fax function in addition to the print function. Such a printing apparatus with a plurality of functions may be referred to as a Multifunction Printer (MFP). Alternatively, the printing apparatus 150 may be a Single Function Peripheral (SFP) with only the print function. Printing may refer to printing on a sheet-like printing medium such as paper or the forming of three-dimensional objects (so-called 3D printing).

The printing apparatus 150 may include a control application 151, a storage apparatus 152, a communication module 153, and a print module 154. The control application 151 performs control of the entire printing apparatus 150. The storage apparatus 152 stores print jobs and information relating to the management server the printing apparatus 150 is connected to. The communication module 153 receives a job notification from the management server, uses job data access information included in the job notification, and receives a print job from the management server. The print module 154 executes printing according to the print job received by the communication module 153.

The control server 160 is a server for controlling the configuration of the printing management system. For example, the control server 160 starts the processing for changing the management server that the printing apparatus 150 is connected to. The control server 160 includes a control application 161 and a database 162. The control application 161 executes processing for controlling the configuration of the printing management system. The database 162 stores information relating to the printing apparatus connected to each management server.

Computer Hardware Configuration Example

Figure 2:
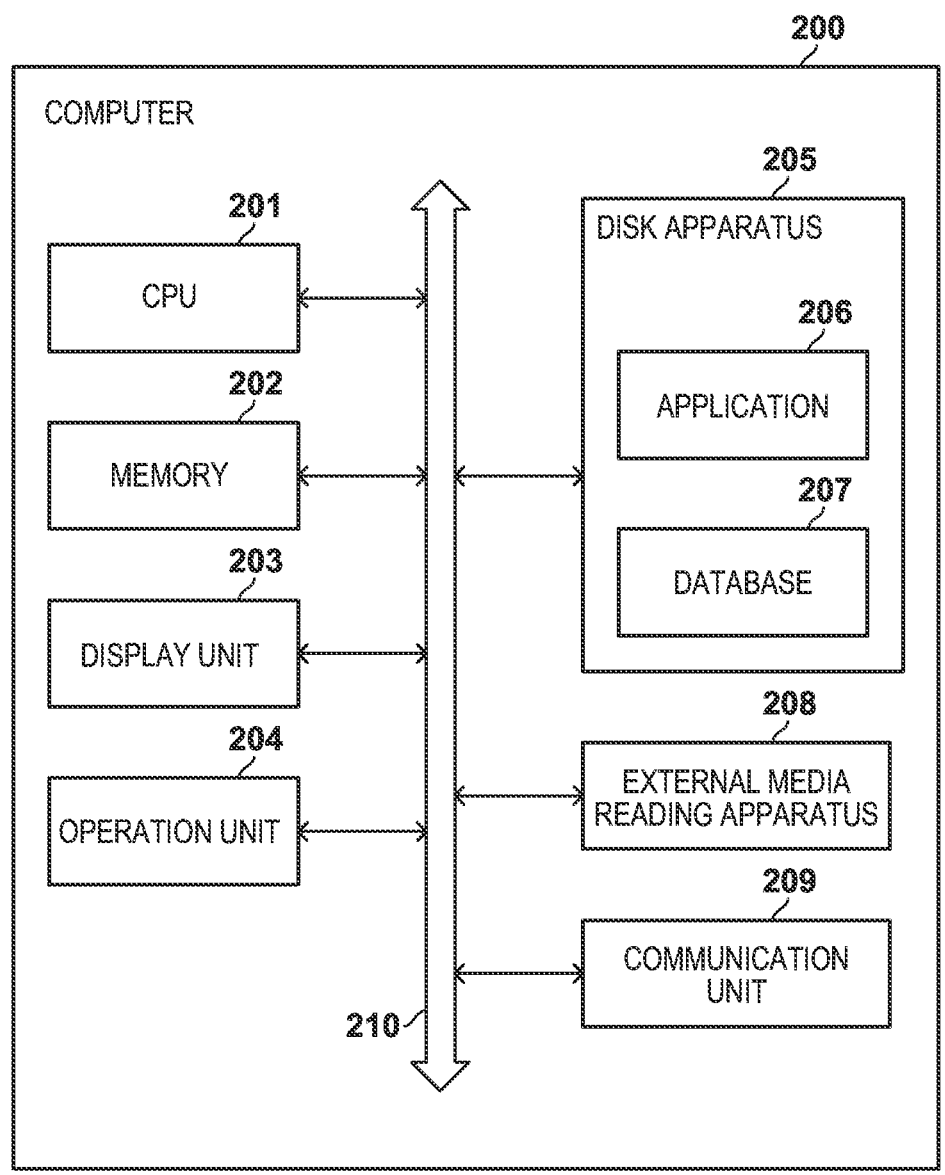
FIG. 2 is a block diagram for describing an example of the hardware configuration of a computer according to an embodiment.

An example of the hardware configuration of a computer 200 according to some embodiments will be described with reference to FIG. 2. The computer 200 may be used as the application server 110, may be used as the management servers 120 and 130, and/or may be used as the control server 160. The computer 200 may include all of the components illustrated in FIG. 2, may not include one or more of the components, and/or may include additional components.

A central processing unit (CPU) 201 is a general-purpose processing circuit that controls the entire operations of the computer 200. A memory 202 is constituted by a random-access memory (RAM) or the like and is used in the temporary storage of data by the CPU 201, buffering, and the like. A display unit 203 is constituted by a liquid crystal display, for example, and displays various types of information to the user of the computer 200. An operation unit 306 is constituted by a keyboard and a mouse, for example, and obtains input from the user of the computer 200.

A disk apparatus 205 stores an application program 206, a database 207, an operating system (OS), and various types of files. The application program 206 may be the application (for example, the control application 121) described using FIG. 1. The database 207 may be the database (for example, the database 122) described using FIG. 1. The disk apparatus 205 may be a hard disk drive (HDD), for example. Instead of the disk apparatus 205, a solid state drive (SSD) or other similar non-volatile storage apparatus may be used. The operations by the computer 200 (for example, the management server 120) described below may be performed by the CPU 201 reading out a program stored in the disk apparatus 205 onto the memory 202 and executing the program.

An external media reading apparatus 208 is an apparatus for reading out information such as files stored on an external storage medium such as an SD card. A communication unit 209 is constituted of a network interface card (NIC), a wireless module, and the like, for example, and is used for communications with external apparatuses. Communications with external apparatuses may be wired or wireless. The components of the computer 200 described above are connected via a bus 210 and can communicate with one another.

Printing Apparatus Hardware Configuration Example

Figure 3:
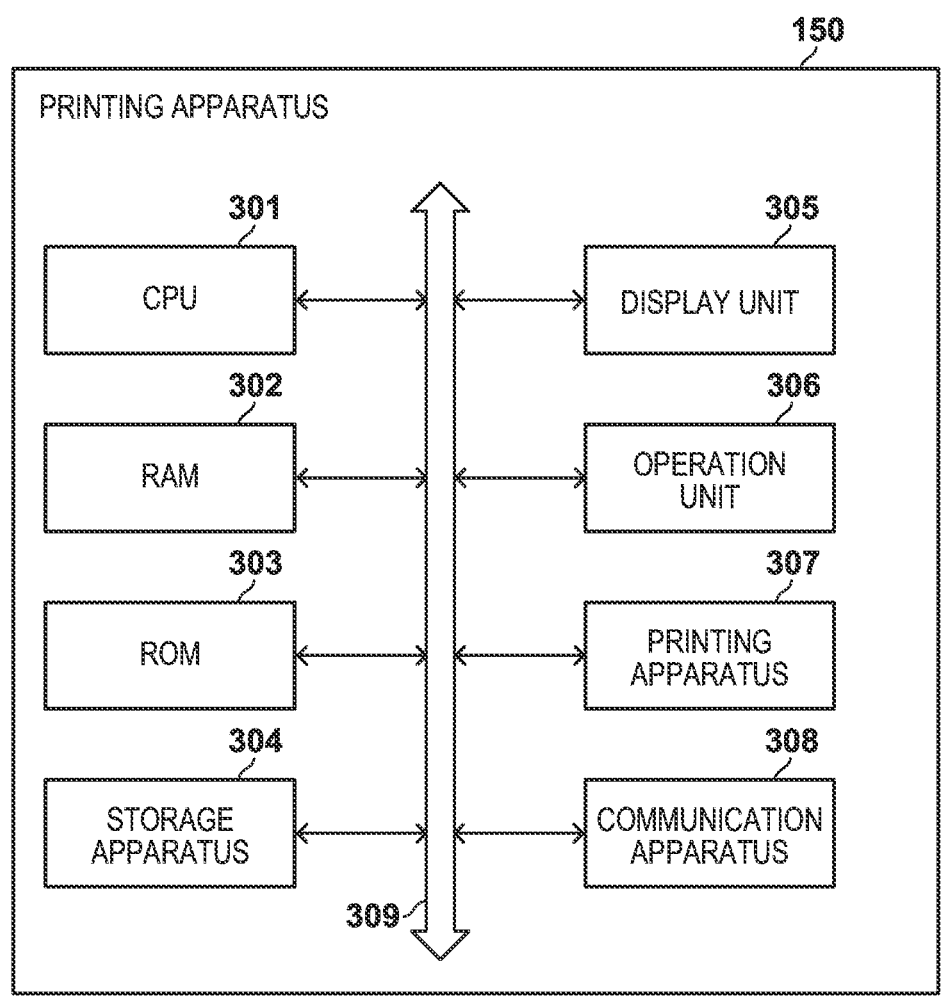
FIG. 3 is a block diagram for describing an example of the hardware configuration of a printing apparatus according to an embodiment.

An example of the hardware configuration of the printing apparatus 150 according to some embodiments will be described with reference to FIG. 3. The printing apparatus 150 may include all of the components illustrated in FIG. 3, may not include one or more of the components, and/or may include additional components.

A CPU 301 is a general-purpose processing circuit that controls the entire operations of the printing apparatus 150. A RAM 302 is used in the temporary storage of data by the CPU 301, buffering, and the like. Read-only memory (ROM) 303 stores an OS and other applications. The ROM 303 may be a non-volatile memory unable to rewrite data or may be a non-volatile memory such as a flash memory that is able to rewrite data. A storage apparatus 304 stores data used by the printing apparatus 150 and print jobs received by a communication apparatus 308, for example. The operations by the printing apparatus 150 described below may be performed by the CPU 301 reading out a program stored in the storage apparatus 304 onto the RAM 302 and executing the program.

A display unit 305 is constituted by a liquid crystal display, for example, and displays various types of information to the user of the printing apparatus 150. The operation unit 306 is constituted by a button and a touch panel, for example, and obtains input from the user of the printing apparatus 150. A printing apparatus 307 performs printing by processing the print job received by the communication apparatus 308. The communication apparatus 308 is constituted of a NIC, a wireless module, and the like, for example, and is used for communications with external apparatuses. Communications with external apparatuses may be wired or wireless. The components of the printing apparatus 150 described above are connected via a bus 309 and can communicate with one another.

Client Apparatus Hardware Configuration Example

Figure 4:
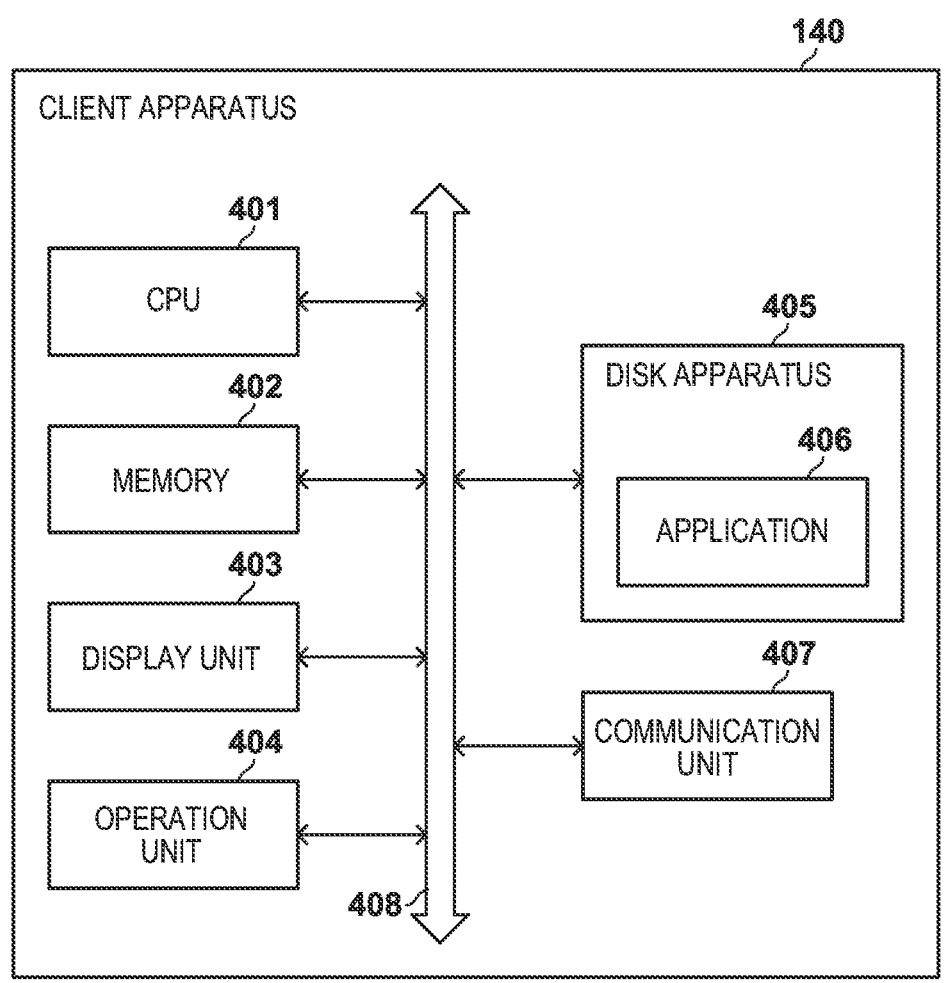
FIG. 4 is a block diagram for describing an example of the hardware configuration of a client apparatus according to an embodiment.

An example of the hardware configuration of the client apparatus 140 according to some embodiments will be described with reference to FIG. 4. The client apparatus 140 may include all of the components illustrated in FIG. 4, may not include one or more of the components, and/or may include additional components. The client apparatus 140 may be a personal computer, may be a mobile communication apparatus such as a smartphone, or may be a different apparatus.

A CPU 401 is a general-purpose processing circuit that controls the entire operations of the client apparatus 140. A memory 402 is constituted by a RAM or the like and is used in the temporary storage of data by the CPU 401, buffering, and the like. A display unit 403 is constituted by a liquid crystal display, for example, and displays various types of information to the user of the client apparatus 140. The operation unit 404 is constituted by a keyboard, a mouse, and a touch panel for example, and obtains input from the user of the client apparatus 140.

A disk apparatus 405 stores an application program 406 and various types of files. The disk apparatus 405 may be an HDD, for example. Instead of the disk apparatus 405, an SSD or other similar non-volatile storage apparatus may be used. The operations by the client apparatus 140 described below may be performed by the CPU 401 reading out a program stored in the disk apparatus 405 onto the memory 402 and executing the program.

A communication apparatus 407 is constituted of a NIC, a wireless module, and the like, for example, and is used for communications with external apparatuses. Communications with external apparatuses may be wired or wireless. The components of the client apparatus 140 described above are connected via a bus 408 and can communicate with one another.

Printing Apparatus Connection Processing

Figure 5:
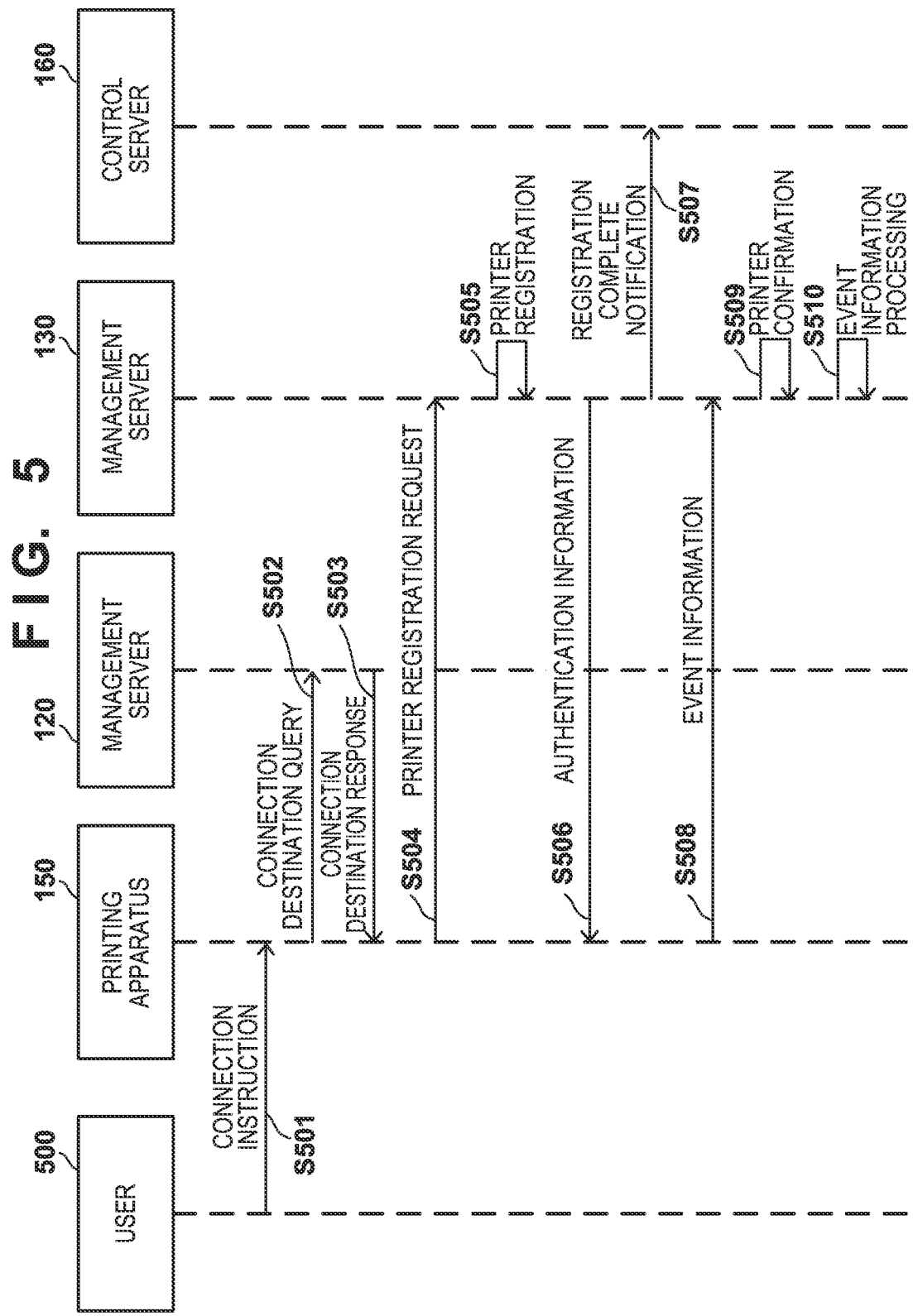
FIG. 5 is a sequence diagram for describing an example of the processing for connecting a printing apparatus to a management server according to an embodiment.

An example of processing for connecting the printing apparatus to the management server will now be described with reference to FIG. 5. By connecting the printing apparatus to one of the management servers in the printing management system, the printing apparatus can use the printing service. In the example described below, the printing apparatus to be connected to the management server is the printing apparatus 150.

In step S501, the control application 151 of the printing apparatus 150, via the operation unit 306, obtains an instruction from a user 500 of the printing apparatus 150 to connect the printing apparatus 150 to the management server of the printing management system. This instruction is referred to as a connection instruction.

In step S502, the communication module 153 of the printing apparatus 150, in response to the connection instruction being obtained, queries one of the management servers as to which management server to connect the printing apparatus 150 to. The query may include dispatch information of the printing apparatus 150. The management server which is the destination of the query may be set in advance and stored in the printing apparatus 150. Next, an example in which the printing apparatus 150 queries the management server 120 will be described below. Alternatively, the printing apparatus 150 may query the management server 130, may query the control server 160, or may query a dedicated server for identifying the management server.

In step S503, in response to a query from the printing apparatus 150 being received, the control application 121 of the management server 120 determines the management server to connect the printing apparatus 150 to. The connection destination management server may be determined based on the dispatch information of the printing apparatus 150 and/or the IP address of the printing apparatus 150 included in the query, for example. Specifically, the control application 121 may estimate the installation location (geographical location) of the printing apparatus 150 based on this information and set a management server located close to the installation location as the connection destination. For example, when a management server is included in the same region as the printing apparatus 150, the control application 121 may determine the management server as the connection destination. The control application 121 responds to the printing apparatus 150 with information (for example, the URL of the management server) for accessing the determined management server. In the example described below, the management server 120 determines the management server 130 as the management server to connect the printing apparatus 150 to. Alternatively, the management server 120 may determine itself to be the management server to connect the printing apparatus 150 to.

In step S504, in response to the response from the management server 120 being received, the communication module 153 of the printing apparatus 150 transmits a request to register the printing apparatus 150 to the management server 130. This request is referred to as a printer registration request. The printer registration request may include identification information of the printing apparatus 150, attribute information of the printing apparatus 150, and the like.

In step S505, in response to the printer registration request being received, the control application 131 of the management server 130 stores the printer information of the printing apparatus 150 that transmitted the printer registration request in the database 132. Newly storing printer information of a printing apparatus in a database in this manner is referred to as registering a printing apparatus. The control application 131 of the management server 130 generates authentication information used for the printing apparatus 150 to access the management server 130 and stores the authentication information in the database 132 as a part of the printer information. The printer information may include authentication information for connecting to a management server.

In step S506, the control application 131 of the management server 130 transmits the authentication information generated in step S505 to the printing apparatus 150. The printing apparatus 150 stores the received authentication information in the storage apparatus 304. Also, the printing apparatus 150 stores that the management server that it is connected to is the management server 130.

In step S507, in response to registration of the printing apparatus 150 being completed, the control application 131 of the management server 130 notifies the control server 160 that registration is complete. This notification is referred to as a registration complete notification. In response to the registration complete notification being received, the control server 160 stores the management server 130 that transmitted the registration complete notification as the registration destination of the printing apparatus 150 in the database 162. Step S506 may be executed first or step S507 may be executed first.

In step S508, in response to an event (for example, an error event, an alert event, or a change in the remaining amount of ink) occurring in the printing apparatus 150, the communication module 153 of the printing apparatus 150 transmits information (event information) of the event to the management server 130. The transmission destination of the event information is the management server (in other words, the management server 130) that the printing apparatus 150 is connected to. The communication module 153 of the printing apparatus 150 adds the authentication information obtained in step S506 to the event information and transmits this.

In step S509, in response to the event information being received, the control application 131 of the management server 130 compares the authentication information received from the printing apparatus 150 and the authentication information stored in the storage apparatus 152. When the two are a match, the control application 131 authenticates that the printing apparatus 150 is the printing apparatus to be managed. In step S510, in response to authentication of the printing apparatus 150 being successful, the control application 131 of the management server 130 executes processing based on the received event information.

Printing Processing

An example of processing when the user of the client apparatus 140 uses the printing service to cause the printing apparatus 150 to execute printing will now be described with reference to FIG. 6. In this example, the printing apparatus 150 is connected to the management server 120. At the starting point in FIG. 6, the user has completed user registration for the printing service and has registered the printing apparatus 150 as the printing apparatus to be used. Also, at the starting point in FIG. 6, the printing apparatus 150 is connected to the management server 120.

In step S601, the client application 141 of the client apparatus 140 transmits a printing instruction to the application server 110 according to an instruction from the user. In step S602, in response to the printing instruction being received, the Web application 111 of the application server 110 identifies the management server to which the printing-executing printing apparatus 150 is connected and transmits a print request to the management server 120 according to the printing instruction. The print request is a request to use the printing apparatus 150 to perform printing. The print request may include the identification information of the printing-executing printing apparatus (in this example, the printing apparatus 150), a printing target specified by the user (for example, a document or photo file), print settings (for example, color mode or double-sided printing), and the like.

In step S603, the control application 121 of the management server 120 generates new print job information and stores this in the database 122. As described above, the print job information includes the progress state of the print job. The progress state of the print job at this time may be "generating", indicating that the generation of a print job is incomplete. In step S604, in response to the print request being received, the control application 121 of the management server 120 generates a print job based on the print request and stores this in the database 122.

In step S605, in response to the print job generation being completed, the control application 121 of the management server 120 updates the print job information of the print job. Specifically, the control application 121 updates the progress state of the print job to "generated", indicating that the print job generation is complete but the printing apparatus has not been notified.

In step S606, the control application 121 of the management server 120, after the completion of the print job generation, notifies the printing apparatus 150 of a print job to be processed by the printing apparatus 150. This notification is referred to as a print job notification. The notification destination printing apparatus 150 is the printing apparatus specified by the print request. The print job notification may be performed in response to the print job generation being completed or may be performed as a response to a query from the printing apparatus 150.

In step S607, in response to the print job notification being received, the control application 151 of the printing apparatus 150 transmits, to the management server 120, a request to transmit the print job. This request is referred to as a print job request.

In step S608, in response to the print job notification being transmitted to the printing apparatus 150, the control application 121 of the management server 120 updates the print job information of the print job. Specifically, the control application 121 updates the progress state of the print job to "notified", indicating that the printing apparatus has been notified but the printing has not been completed. Step S608 may be performed in response to the print job notification being transmitted in step S606 or may be performed in response to the print job request being received in step S607.

In step S609, in response to the print job request being received, the control application 121 of the management server 120 responds to the printing apparatus 150 with the print job specified by the print job request. This response is referred to as a print job response.

In step S610, the print module 154 of the printing apparatus 150 executes printing according to the received print job. In step S611, in response to the printing being normally completed, the control application 151 of the printing apparatus 150 notifies the management server 120 that the print job has been completed. This notification is referred to as a print job complete notification. The print job complete notification may include the identification information of the print job and the identification information of the printing apparatus 150.

In step S612, in response to the print job complete notification being received, the control application 121 of the management server 120 updates the print job information relating to the print job. Specifically, the control application 121 updates the progress state of the print job to "complete", indicating that the printing has been completed.

In step S613, the control application 121 of the management server 120 deletes the print job for which printing is complete from the database 122. In step S614, the control application 121 of the management server 120 transmits the printing result to the application server 110. The printing result indicates that the printing has been completed according to the print request received in step S602.

In step S615, the Web application 111 of the application server 110 notifies the client apparatus 140 of the printing result. The client apparatus 140 presents the printing result to the user.

The processing executed by the printing service for one print job has been described above using FIG. 6. The printing service may execute the processing of a plurality of print jobs in parallel. The plurality of print jobs may be print jobs for different printing apparatuses or print jobs for the same printing apparatus. As described above, the management server 120 updates the progress state of the print jobs based on the notifications received in steps S603, S605, S608, and S612 from the printing apparatus connected to the management server 120. Accordingly, even when a plurality of print jobs are processed in parallel, the management server 120 can appropriately manage the state of the print jobs.

Additional Service Providing Processing

An example of processing for providing the user with an additional service provided by the printing system will be described with reference to FIG. 7. An additional service is a service associated with the printing apparatus connected to the printing management system and may be a service provided in addition to the printing service, for example. An example of an additional service is an automatic delivery service for a consumable of the printing apparatus 150. With an automatic delivery service, the application server 110 can obtain the remaining amount of a consumable (ink or toner) from the printing apparatus 150 via the management server. The application server 110 may monitor the remaining amount of the consumable and order the consumable when the remaining amount is equal to or less than a threshold. Another example of an additional service is a printing apparatus usage situation visualization service. A visualization service includes the application server 110 collecting the number of pages, the color mode, and the sheet size information for printing executed by the printing apparatus 150 and presenting the usage situation of the printing apparatus 150 to the user. Yet another example of an additional service is a charging service for charging a user or giving points to a user according to the number of sheets printed.

Figure 7:
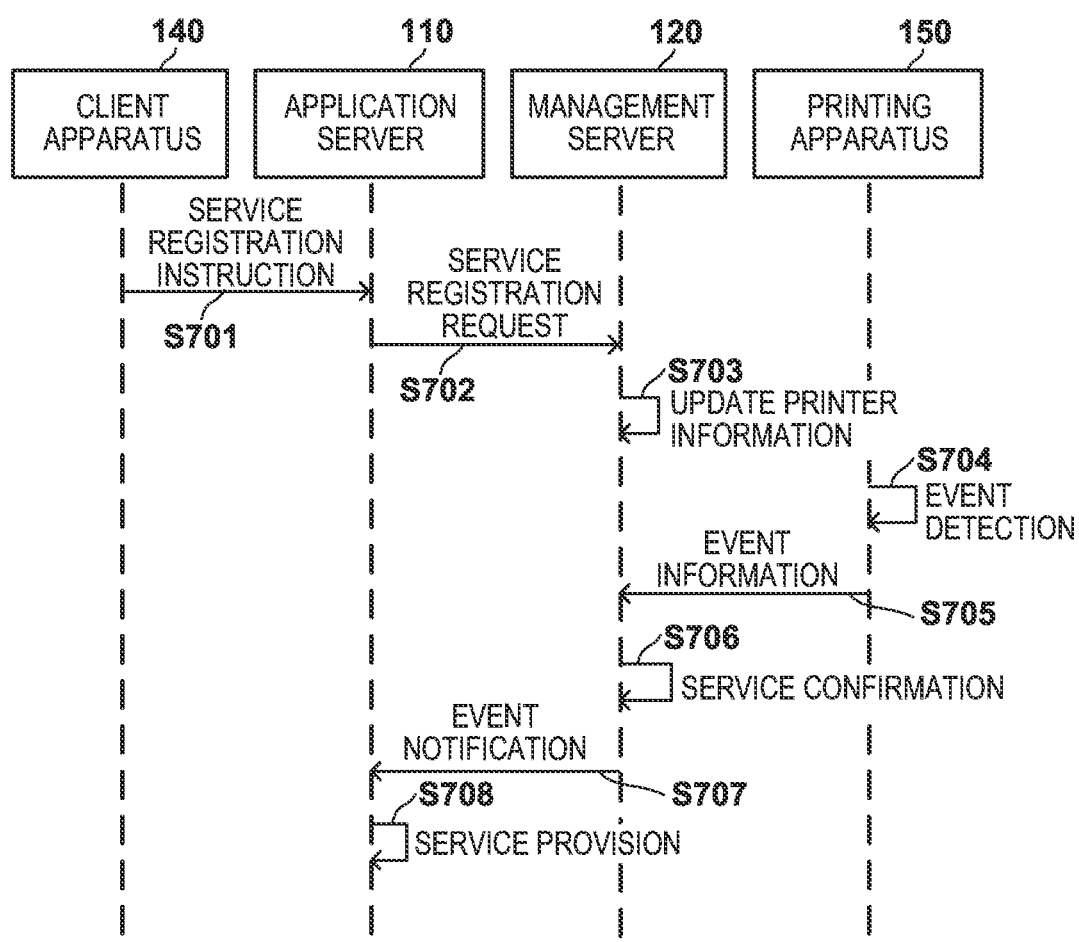
FIG. 7 is a sequence diagram for describing an example of processing for providing an additional service according to an embodiment.

At the starting point in FIG. 7, the user has completed user registration for the printing service and has registered the printing apparatus 150 as the printing apparatus to be used. Also, at the starting point in FIG. 7, the printing apparatus 150 is connected to the management server 120.

In step S701, the client application 141 of the client apparatus 140 transmits an instruction, to the application server 110, to set a specific printing apparatus as the additional service target according to an instruction from the user. This instruction is referred to as a service registration instruction. The service registration instruction may include the identification information (for example, serial number) of the printing apparatus, the type of additional service, and the like. The printing apparatus which is the target of the additional service is referred to as the target printing apparatus in the description of FIG. 7. In the example described below, the target printing apparatus is the printing apparatus 150.

In step S702, the Web application 111 of the application server 110 identifies the management server (in this example, the management server 120) that the printing apparatus 150 is connected to and transmits a service registration request to the management server 120. A service registration request is a request to register the target printing apparatus as an additional service target. The service registration request may include the identification information of the target printing apparatus, the type of additional service, and the like. The Web application 111 may identify the management server that is managing the printing apparatus 150 via a query to the control server 160, for example. Alternatively, the management server that has executed printer registration in step S505 in FIG. may notify the application server 110 of the identification information of the printing apparatus connected to the management server, and the application server 110 may use this information.

In step S703, in response to the service registration request being received, the control application 121 of the management server 120 updates the printer information of the printing apparatus 150 stored in the database 122. Specifically, the control application 121 registers, as the printer information of the printing apparatus 150, that the printing apparatus 150 is the target to use the additional service specified in the service registration request. In this manner, the printer information may include information indicating the service to be provided relating to the printing apparatus.

In step S704, the control application 151 of the printing apparatus 150 detects that, in the printing apparatus 150, an event (for example, a change in the remaining amount of ink) to notify the management server 120 of has occurred. In step S705, in response to the occurrence of an event being detected, the control application 151 of the printing apparatus 150 transmits event information relating to the event to the management server 120.

In step S706, in response to the event information being received, the control application 121 of the management server 120 confirms the additional service registered for the printing apparatus (in this example, the printing apparatus 150) that transmitted the event information. This confirmation may be performed by referencing the printer information of the printing apparatus 150 stored in the database 122. In the example described below, the printing apparatus 150 is registered for a specific additional service.

In step S707, the control application 121 of the management server 120 transmits an event notification to the application server 110. In step S708, in response to the event notification being received, the Web application 111 of the application server 110 executes processing relating to the additional service being used by the user. For example, when the printing apparatus 150 is registered for a visualization service, the Web application 111 transmits the usage situation of the printing apparatus 150 to the client apparatus 140.

Processing to Change Server

An example of processing for changing the management server in the printing management system in FIG. 1 will now be described with reference to FIG. 8. At the starting point in FIG. 8, the user has completed user registration for the printing service and has registered the printing apparatus 150 as the printing apparatus to be used. Also, at the starting point in FIG. 8, the printing apparatus 150 is connected to the management server 120.

In step S801, the control application 161 of the control server 160 transmits, to the management server 120, an instruction to change the connection destination of the printing apparatus 150 connected to the management server 120 to the management server 130. This instruction is referred to as a connection change instruction. The connection change instruction includes the identification information of the printing apparatus (in this example, the printing apparatus 150) that is changing connection destination and the identification information of the post-change management server (in this example, the management server 130). The control server 160 may execute step S801 according to an instruction from the user of the control server 160 (for example, an administrator of the printing service or an administrator of the cloud service). Alternatively, when a pre-determined condition is satisfied (for example, when the load of the management server 120 is greater than a threshold), the control server 160 may execute step S801. In the description using FIGS. 8 to 10, the specific printing apparatus (in this example, the printing apparatus 150) that is changing connection destination is referred to as the target printing apparatus. The printing apparatus specified by one connection change instruction may be a single printing apparatus, may be a plurality of printing apparatuses, or may be all of the printing apparatuses connected to the management server 120. When a plurality of printing apparatuses are specified by one connection change instruction, the followings steps S802 to S813 are executed for each printing apparatus. The connection destination management server may be changed because of a change in the region of the cloud environment or because of the migration of the management server, for example.

In step S802, in response to the connection change instruction being received, the control application 121 of the management server 120 transmits printer information of the target printing apparatus to the management server 130. Since the target printing apparatus is connected to the management server 120, the printer information of the target printing apparatus is stored in the database 122 of the management server 120. In some embodiments, the control application 121 does not transmit print job information of the target printing apparatus at this point in time.

In step S803, in response to the printer information of the target printing apparatus being received, the control application 131 of the management server 130 registers the printer information in the database 132. Registering printer information in the database 132 includes stored the printer information in the database 132. In step S804, the control application 131 of the management server 130, after registering the printer information in the database 132, notifies the management server 120 that printer information registration has been completed. This notification is referred to as a registration complete notification. The registration complete notification indicates that the registration of the printer information in the management server 130 has been normally completed.

In step S805, in response to the registration complete notification being received, the control application 121 of the management server 120 instructs the printing apparatus 150 to connect to the management server 130. The instruction includes information (for example, the IP address of the management server 130 and the like) for connecting to the post-change management server 130. Step S805 may be performed in response to the registration complete notification being received, as described above. Alternatively, step S805 may be performed without waiting for the registration complete notification to be received. For example, step S805 may be performed after the connection change instruction is received in step S801 or after the printer information is transmitted in step S802.

In step S806, the control application 151 of the printing apparatus 150 changes the connection destination management server from the management server 120 to the management server 130. For example, the control application 151 changes the setting value of the address of the connection destination management server stored in the storage apparatus 152 to the address of the management server 130. After the change, the control application 151 of the printing apparatus 150 transmits information to be provided to the printing management system to the management server 130. In step S807, the control application 151 of the printing apparatus 150 transmits a notification of connection to the management server 130 to the management server 130, which is the new connection destination. This notification is referred to as a change complete notification.

In step S808, in response to the change complete notification being received from the printing apparatus 150, the control application 131 of the management server 130 transmits a change complete notification (in other words, a notification of the change in the connection destination of the printing apparatus 150 to the management server 130) to the management server 120.

In step S809, in response to the change complete notification being received, the control application 121 of the management server 120 transmits print job information of the target printing apparatus to the management server 130. In step S810, in response to the print job information of the target printing apparatus being received, the control application 131 of the management server 130 registers the print job information in the database 132.

In step S811, the control application 131 of the management server 130, after registering the print job information in the database 132, notifies the management server 120 that print job information registration has been completed. This notification is referred to as a registration complete notification. The registration complete notification indicates that the registration of the print job information in the management server 130 has been normally completed.

In step S812, in response to the registration complete notification being received, the control application 121 of the management server 120 deletes the printer information of the target printing apparatus and the print job information from the database 122. By deleting unnecessary information in this manner, the capacity of the storage apparatus of the management server 120 can be used effectively. Step S812 may be performed without waiting for the registration complete notification to be received. For example, step S812 may be performed after the print job information is transmitted in step S809.

In step S813, in response to the registration complete notification being received, the control application 121 of the management server 120 notifies the control server 160 that the connection destination change for the target printing apparatus has been completed. Step S812 may be executed first or step S813 may be executed first. In step S813, the control application 131 of the management server 130 may notify the control server 160 that the connection destination change for the target printing apparatus has been completed.

Figure 6:
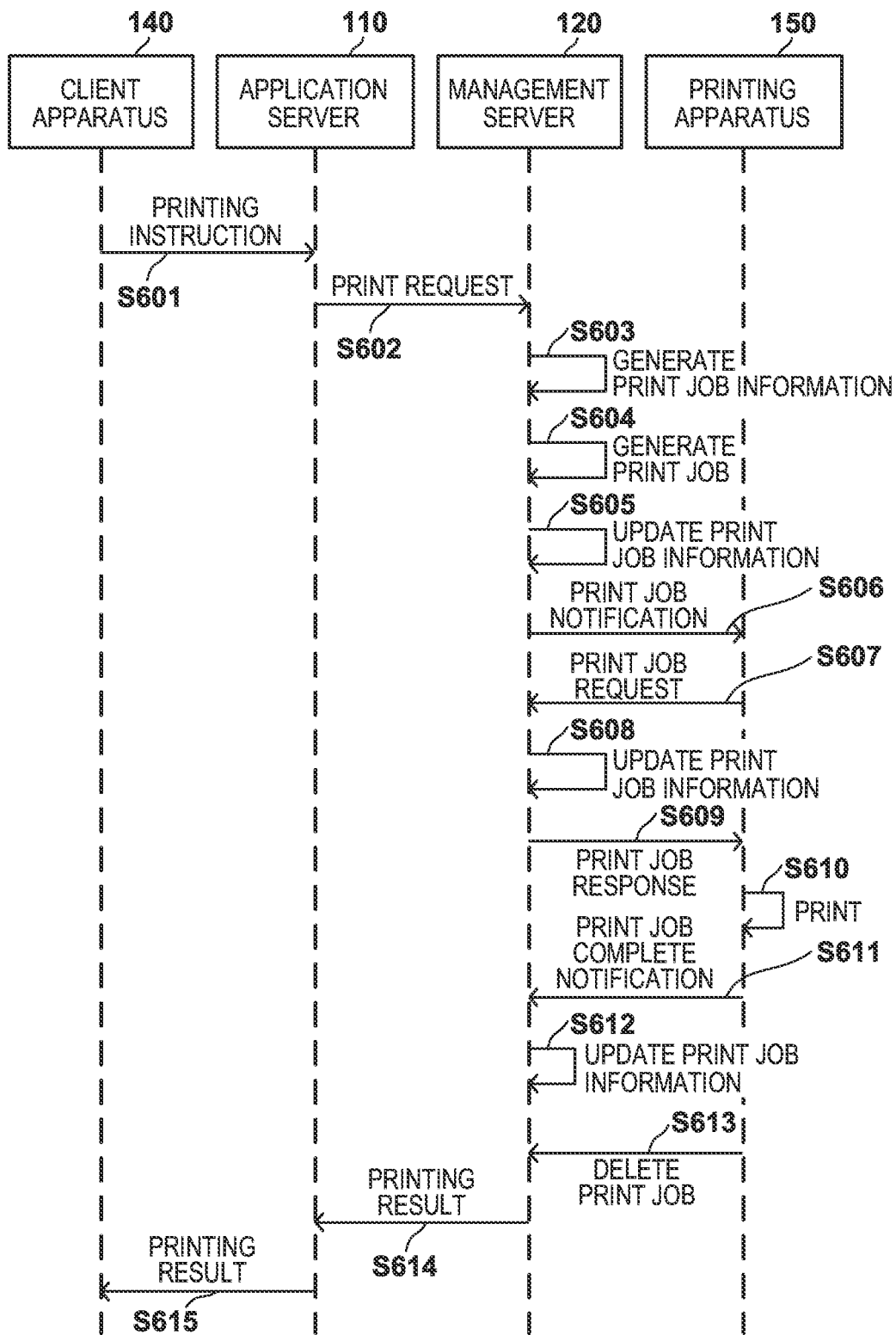
FIG. 6 is a sequence diagram for describing an example of printing processing according to an embodiment.
Figure 8:
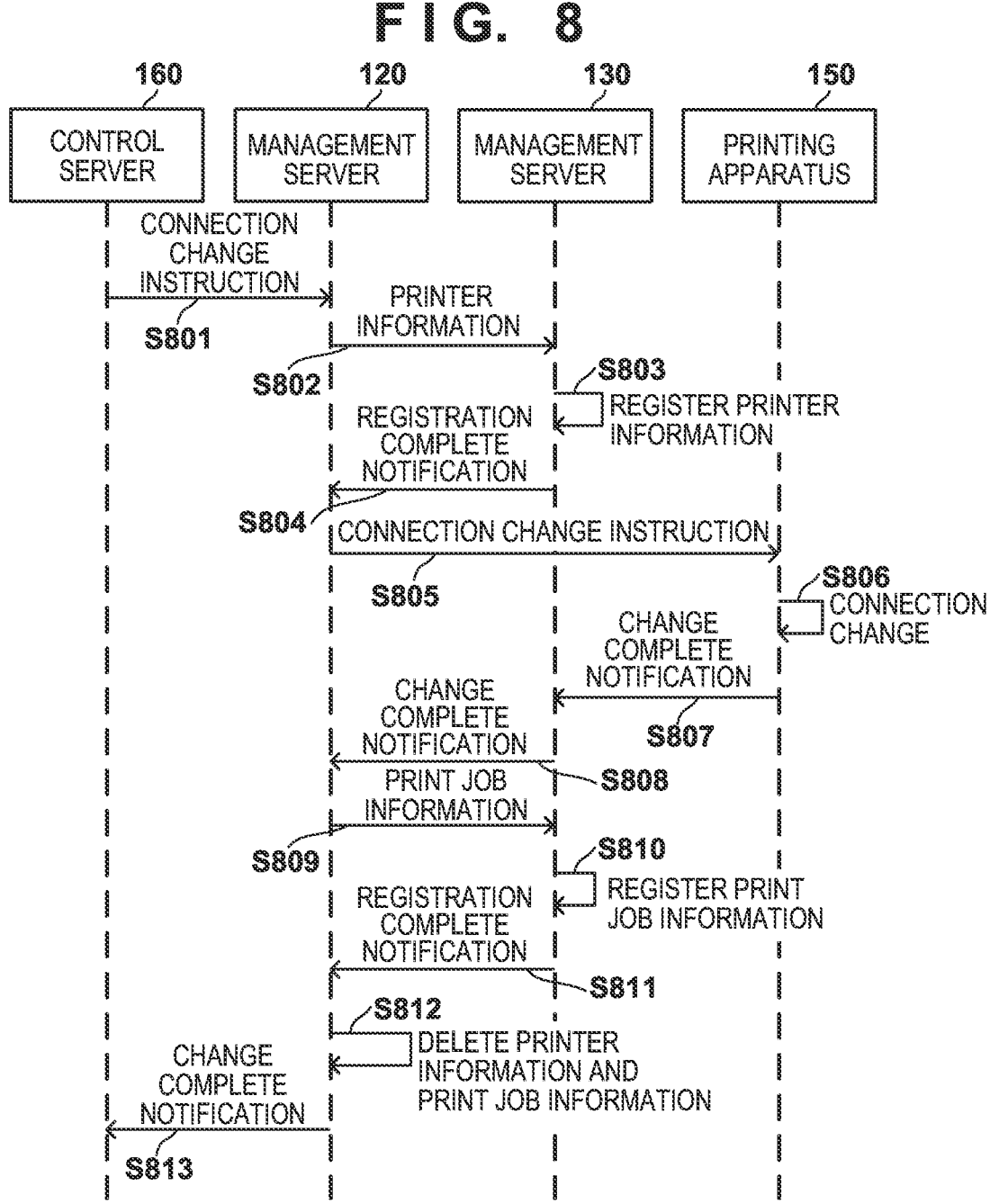
FIG. 8 is a sequence diagram for describing an example of processing for changing management servers according to an embodiment.

While the method illustrated in FIG. 8 is being executed, a print job may be executed in the printing apparatus 150 as described using FIG. 6. A notification of the progress state of the print job from the printing apparatus 150 is transmitted to the management server 120 before step S806 is executed and is transmitted to the management server 130 after step S806 is executed. In the present embodiment, since the print job information is transmitted to the management server 130 after step S806 is executed, the management server 120 can apply all of the information relating to the print job received from the printing apparatus 150 to the print job information. In this manner, in the present embodiment, even when the connection destination management server of the printing apparatus changes while the printing service is being provided, in the printing service, the state of the print job is appropriately managed.

In the method in FIG. 8, after the connection destination of the printing apparatus 150 is changed in step S806 and before the management server 130 registers the print job information in step S810, the information relating to the print job may be transmitted from the printing apparatus 150 to the management server 130. In such a case, the management server 130 may defer the processing of the information relating to the print job received from the printing apparatus 150 until the management server 130 has registered the print job information in step S810.

In the method in FIG. 8, the management server 120 receives the connection change instruction from the control server 160 in step S801. Alternatively, the management server 120 may obtain the connection change instruction in a different manner. For example, the connection change instruction may be provided to the management server 120 by an operator of the printing control system using an operation unit 204 of the management server 120.

In the method in FIG. 8, the management server 120 does not transmit the print job information of the printing apparatus 150 to the management server 130 in the time from when the connection change instruction is received in step S801 to when the connection change instruction is transmitted in the step S805. Alternatively, the management server 120 may transmit the print job information to the management server 130 between step S801 and step S805 in addition to transmitting the print job information in step S809. In this case, in step S809, the management server 120 may transmit only the portion from the print job information that has been updated from the previous transmission (transmission between step S801 and step S805) to the management server 130.

Change Source Operations for Changing Server

Figure 9:
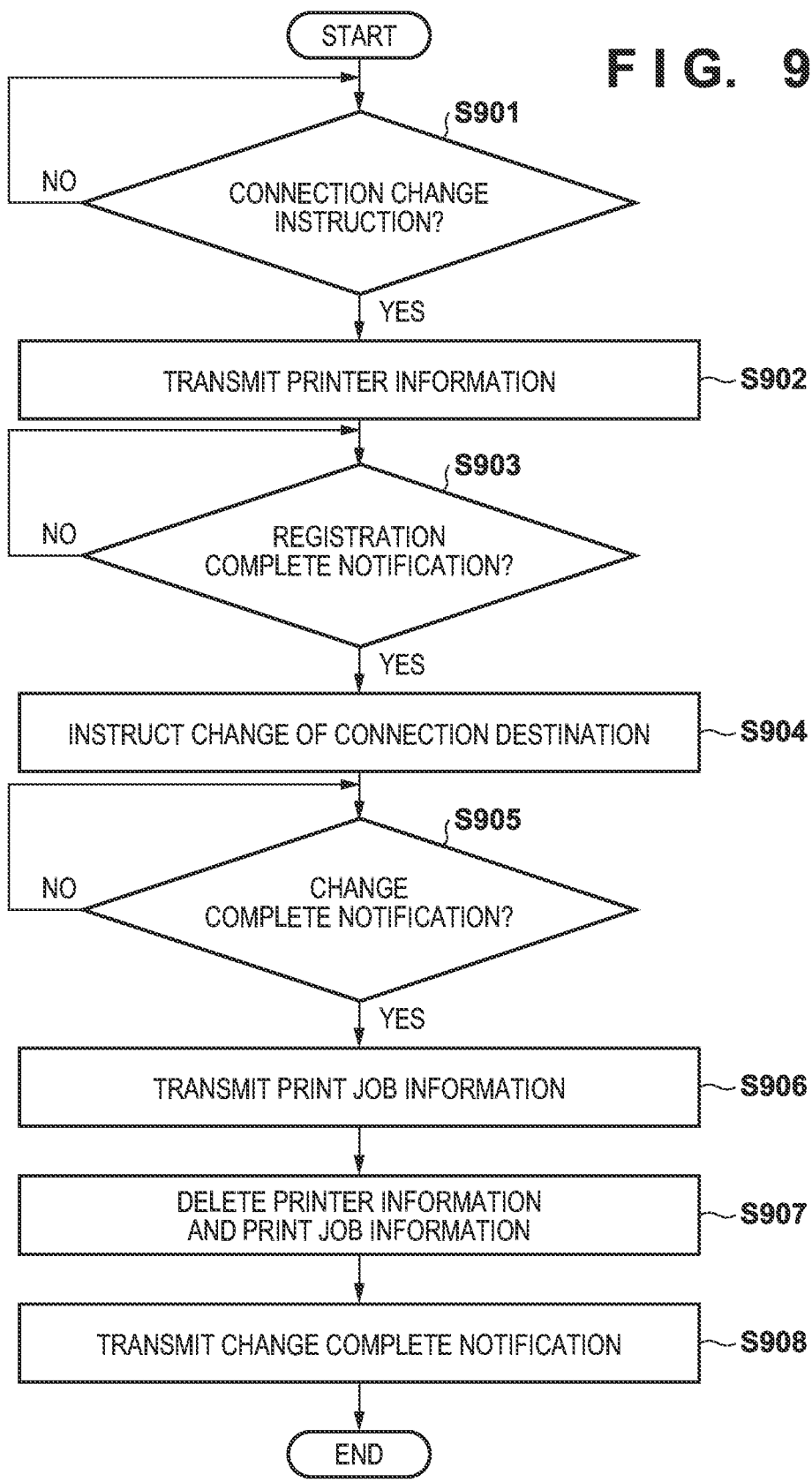
FIG. 9 is a flow diagram for describing an example of processing for changing management servers according to an embodiment.

An example of operations of the management server which is the change source (in the example in FIG. 8, the management server 120) in the method in FIG. 8 will now be described with reference to FIG. 9. The management server included in the printing management system may start the operations in FIG. 9 after startup. Redundant descriptions of content described using FIG. 8 will be omitted.

In step S901, the control application 121 determines whether or not a connection change instruction has been obtained. When the control application 121 determines that a connection change instruction has been obtained (YES in step S901), the processing transitions to step S902. Otherwise (NO in step S901), step S901 is repeated. Step S901 corresponds to step S801. In step S902, the control application 121 transmits the printer information of the target printing apparatus to the management server 130. Step S902 corresponds to step S802.

In step S903, the control application 121 determines whether or not a registration complete notification has been received. When the control application 121 determines that a registration complete notification has been received (YES in step S903), the processing transitions to step S904. Otherwise (NO in step S903), step S903 is repeated. Step S903 corresponds to step S804. In step S904, the control application 121 instructs the target printing apparatus to connect to the management server 130. Step S904 corresponds to step S805.

In step S905, the control application 121 determines whether or not a change complete notification has been received. When the control application 121 determines that a change complete notification has been received (YES in step S905), the processing transitions to step S906. Otherwise (NO in step S905), step S905 is repeated. Step S905 corresponds to step S808. In step S906, the control application 121 transmits the print job information of the target printing apparatus to the management server 130. Step S906 corresponds to step S809.

In step S907, the control application 121 deletes the printer information of the target printing apparatus and the print job information from the database 122. Step S907 corresponds to step S812. In step S908, the control application 121 transmits the change complete notification to the control server 160. Step S908 corresponds to step S813.

Change Destination Operations for Changing Management Server

Figure 10:
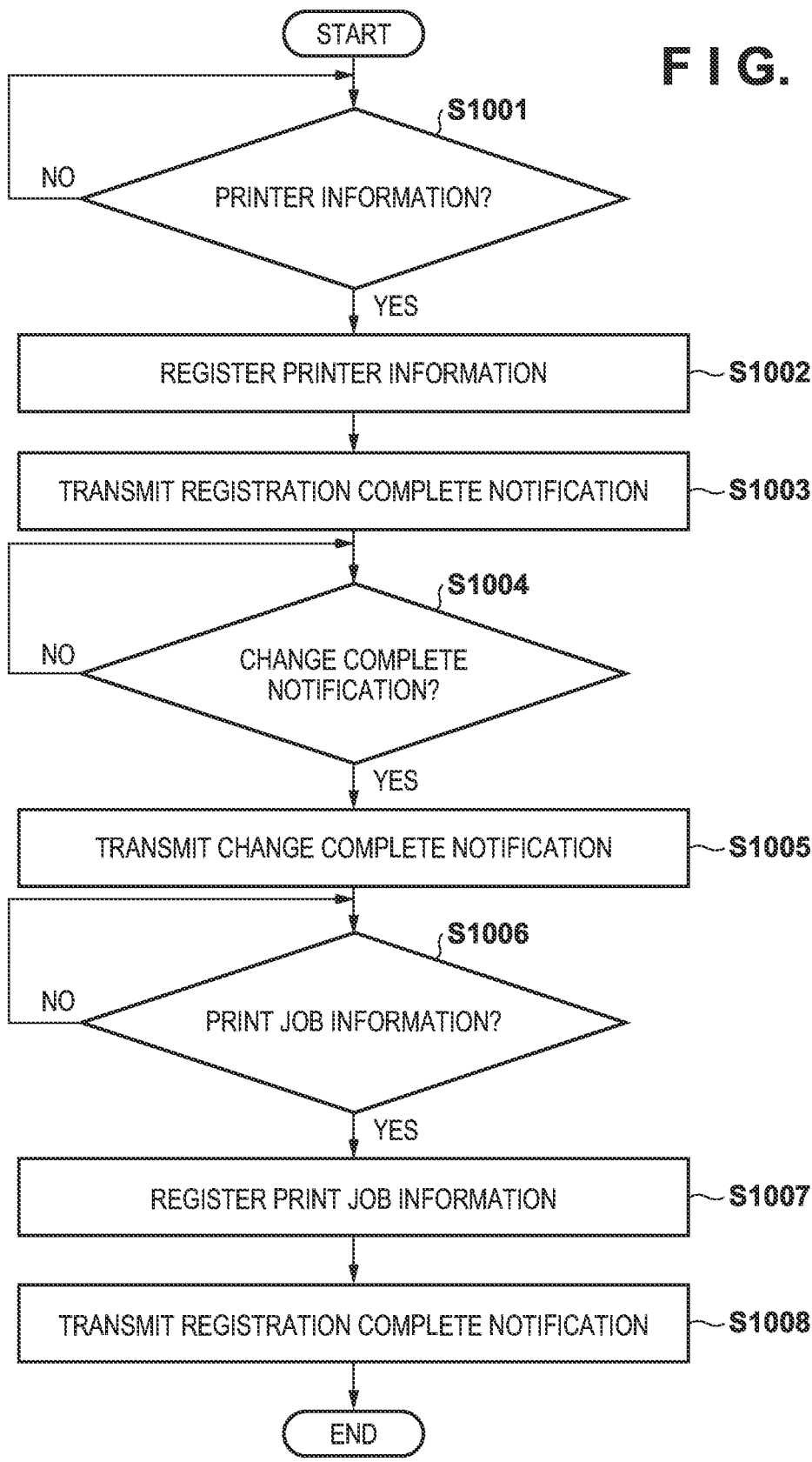
FIG. 10 is a flow diagram for describing an example of processing for changing management servers according to an embodiment.

An example of operations of the management server which is the change destination (in the example in FIG. 8, the management server 130) in the method in FIG. 8 will now be described with reference to FIG. 10. The management server included in the printing management system may start the operations in FIG. 10 after startup. Redundant descriptions of content described using FIG. 8 will be omitted.

In step S1001, the control application 131 determines whether or not the printer information has been received. When the control application 131 determines that the printer information has been received (YES in step S1001), the processing transitions to step S1002. Otherwise (NO in step S1001), step S1001 is repeated. Step S1001 corresponds to step S802. In step S1002, the control application 131 registers the printer information of the target printing apparatus in the database 132. Step S1002 corresponds to step S803. In step S1003, the control application 131 transmits a registration complete notification to the management server 120. Step S1003 corresponds to step S804.

In step S1004, the control application 131 determines whether or not a change complete notification has been received. When the control application 131 determines that a change complete notification has been received (YES in step S1004), the processing transitions to step S1005. Otherwise (NO in step S1004), step S1004 is repeated. Step S1004 corresponds to step S807. In step S1005, the control application 131 transmits a change complete notification to the management server 120. Step S1005 corresponds to step S808.

In step S1006, the control application 131 determines whether or not the print job information has been received. When the control application 131 determines that the print job information has been received (YES in step S1006), the processing transitions to step S1007. Otherwise (NO in step S1006), step S1006 is repeated. Step S1006 corresponds to step S809. In step S1007, the control application 131 registers the print job information of the target printing apparatus in the database 132. Step S1007 corresponds to step S810. In step S1008, the control application 131 transmits a registration complete notification to the management server 120. Step S1008 corresponds to step S811.

In the example described above, the connection destination management server for the printing apparatus is changed while a print job is being executed. The embodiment described above may be applied not only to processing executed while a print job is being executed but also to discretionary processing for changing the print job information relating to a print job.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-108460, filed Jul. 5, 2022, which is hereby incorporated by reference herein in its entirety.

What is claimed is:

1. A system comprising:
a plurality of management servers for providing a printing service, wherein
each of the plurality of management servers manages printer information relating to a printing apparatus connected thereto and print job information relating to a print job to be executed by a printing apparatus connected thereto,
the plurality of management servers include a first management server and a second management server, and
the first management server is configured to,
after the first management server obtains a change instruction to change a connection destination of a specific printing apparatus connected to the first management server to the second management server, transmit the printer information of the specific printing apparatus to the second management server,
after the first management server obtains the change instruction, instruct the specific printing apparatus to connect to the second management server, and
after the connection destination of the specific printing apparatus is changed to the second management server, transmit the print job information of the specific printing apparatus to the second management server,
wherein, after the first management server obtains the change instruction, the first management server continues to receive and manage updated print job information from the specific printing apparatus until the connection destination of the specific printing apparatus has been changed to the second management server.

2. The system according to claim 1, wherein
the first management server is configured to not transmit the print job information of the specific printing apparatus to the second management server in time from when the first management server obtains the change instruction to when the first management server instructs the specific printing apparatus to connect to the second management server.

3. The system according to claim 1, wherein after the first management server transmits the print job information of the specific printing apparatus to the second management server, the first management server is configured to delete the printer information and the print job information of the specific printing apparatus stored in the first management server.

4. The system according to claim 1, wherein after the second management server receives, from the specific printing apparatus, a notification that the specific printing apparatus is connected to the second management server, the second management server is configured to notify the first management server that the connection destination of the specific printing apparatus has been changed to the second management server.

5. The system according to claim 1, wherein the printer information includes at least one of identification information of a printing apparatus, information indicating a provided service relating to a printing apparatus, or authentication information for connecting a printing apparatus to the first management server.

6. The system according to claim 1, wherein the print job information includes a progress state of the print job, and each of the plurality of management servers is configured to update the progress state of the print job based on a notification received from a printing apparatus connected thereto.

7. The system according to claim 1, wherein the first management server and the second management server are installed in different regions of a cloud environment.

8. A method executed by a plurality of management servers for providing a printing service, each of the plurality of management servers managing printer information relating to a printing apparatus connected thereto and print job information relating to a print job to be executed by a printing apparatus connected thereto, and the plurality of management servers including a first management server and a second management server, the method comprising:

after the first management server obtains a change instruction to change a connection destination of a specific printing apparatus connected to the first management server to the second management server, the first management server transmitting, the printer information of the specific printing apparatus to the second management server;

after the first management server obtains the change instruction, instructing, by the first management server, the specific printing apparatus to connect to the second management server; and after the connection destination of the specific printing apparatus is changed to the second management server, transmitting, by the first management server, the print job information of the specific printing apparatus to the second management server, wherein, after the first management server obtains the change instruction, the first management server continues to receive and manage updated print job information from the specific printing apparatus until the connection destination of the specific printing apparatus has been changed to the second management server.

* * * * *